UNITED STATES PATENT OFFICE 2,327,596

PRINTING INK

Donald Robert Erickson and Paul J. Thoma,
Kalamazoo, Mich.

No Drawing. Application August 11, 1941,
Serial No. 406,400

2 Claims. (Cl. 106—30)

This invention relates to improvements in printing ink.

This invention relates to printing inks and improved pigments which are particularly suitable for use in printing inks. It relates in particular to improved molybdated pigments and inks made therefrom. It relates in particular to inks in which the pigments are used in a varnish comprising a liquid polyglycol and a resin consisting either of a rosin or a terpene hydrocarbon of the formula $C_{10}H_{16}$ such as alpha terpinene modified by an alpha beta unsaturated organic polybasic acid such as maleic or fumaric. Such inks have water tolerance in that the resins will not separate out on the press when high humidities are encountered. After printing of the inks, however, the printed film may be treated by water to separate the resin at the surface of the film to form a non-offsetting film.

The objects of the invention are:

First, to provide a new and improved molybdated pigment.

Second, to provide such a pigment which is clear and clean in appearance.

Third, to provide an ink using a molybdated pigment which is workable and will not become hard on standing to the extent that would occur if unimproved molybdated pigments were employed.

Fourth, to provide such an ink which has an improved body.

Fifth, to provide such an ink which can be treated with water after printing as aforesaid to eliminate offset.

Further objects and advantages pertaining to details and economies will appear from the description to follow.

In carrying out the invention, the molybdated pigment is resinated with a resin comprising either a rosin or a terpene hydrocarbon of the formula $C_{10}H_{16}$ such as alpha terpinene modified with an alpha beta unsaturated organic polybasic acid such as maleic or fumaric. The modified rosin may be obtained commercially under the trade name "Teglac 127." The modified terpene hydrocarbon may be obtained commercially under the trade name "Petrex Acid."

The resination of the pigment is done in the pulp state in substantially the same way as pigments are resinated with rosin. The pigment in the pulp state is thoroughly mixed with the sodium soap of the resin or an alcohol solution of the resin. Up to equal parts by weight on a dry basis of the resin and pigment are used.

The resin is precipitated after the aforesaid phase of the treatment and the resinated pigment is then dried and ground. The pigment is then incorporated in the usual way in a varnish. The preferred varnish consists of 50 parts by weight of a liquid polyglycol such as diethylene glycol, and 50 parts by weight of either the aforesaid modified rosin or the aforesaid modified terpene hydrocarbon. A mixture of the modified rosin and the modified terpene hydrocarbon may be used in the ink or in the resination of the pigment.

The molybdated pigments thus resinated are much clearer and cleaner in appearance than typical molybdated pigments. The molybdated pigments may be malachite green, methyl violet, auramine, Victoria blue, rhodamine, brilliant blue and other molybdated pigments. Not only is the characteristic dirty color of these pigments improved and cleared up by the aforesaid resinating, but the ink made with the improved resinated molybdated pigments is much more workable than ink made with such molybdated pigments which have not been improved by resinating. The ink does not get hard as would be the case with the unresinated molybdated pigments in anywhere near as short a time and the body of the ink is improved.

The ink consisting of the liquid polyglycol and the particular resin binder retains its water tolerance when the improved resinated molybdated pigments are employed. The water tolerance is not cut down as would be the case with molybdated pigments resinated with rosin.

The terms and expressions which have been herein employed are used as terms of description and not of limitation, and there is no intention, in the use of such terms and expressions of excluding any equivalents of the features shown and described, or portions thereof, but it is recognized that various modifications are possible within the scope of the invention claimed.

Having thus described our invention, what we claim as new and desire to secure by Letters Patent is:

1. A non-offsetting printing ink having a high water tolerance comprising a varnish comprising a liquid polyglycol as a solvent for the resin, and a resin selected from the group consisting of rosin modified with an alpha beta unsaturated organic polybasic acid and a terpene hydrocarbon of the formula $C_{10}H_{16}$ modified by an alpha beta unsaturated organic polybasic acid and in sufficient amount to form, when subjected to steam immediately after printing, a thin hard film of resin over the exposed surfaces of the printed film, and a pigment comprising a molybdated pigment selected from the group consisting of malachite green, methyl violet, auramine, Victoria blue, rhodamine and brilliant blue resinated with an equal amount by weight of a resin selected from the group consisting of rosin modified with an alpha beta unsaturated organic polybasic acid and a terpene hydrocarbon of the formula $C_{10}H_{16}$ modified by an alpha beta unsaturated organic polybasic acid whereby said water tolerance is maintained, printing characteristics are improved, and spoilage on storage is prevented.

2. A non-offsetting printing ink having a high water tolerance comprising a varnish comprising a liquid polyglycol as a solvent for the resin, and a resin selected from the group consisting of rosin modified with an alpha beta unsaturated organic polybasic acid and a terpene hydrocarbon of the formula $C_{10}H_{16}$ modified by an alpha beta unsaturated organic polybasic acid and in sufficient amount to form, when subjected to steam immediately after printing, a thin hard film of resin over the exposed surfaces of the printed film, and a pigment comprising a molybdated pigment selected from the group consisting of malachite green, methyl violet, auramine, Victoria blue, rhodamine and brilliant blue resinated with a resin selected from the group consisting of rosin modified with an alpha beta unsaturated organic polybasic acid and a terpene hydrocarbon of the formula $C_{10}H_{16}$ modified by an alpha beta unsaturated organic polybasic acid whereby said water tolerance is maintained, printing characteristics are improved, and spoilage on storage is prevented.

DONALD ROBERT ERICKSON.
PAUL J. THOMA.